(12) United States Patent
Frampton

(10) Patent No.: US 7,793,680 B2
(45) Date of Patent: *Sep. 14, 2010

(54) ELECTROMECHANICAL REGULATOR WITH PRIMARY AND BACKUP MODES OF OPERATION FOR REGULATING PASSENGER OXYGEN

(75) Inventor: Robert Frederick Frampton, Hamburg, NY (US)

(73) Assignee: B/E Intellectual Property, Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/554,564

(22) Filed: Sep. 4, 2009

(65) Prior Publication Data

US 2009/0320843 A1 Dec. 31, 2009

Related U.S. Application Data

(63) Continuation of application No. 11/489,935, filed on Jul. 20, 2006, now Pat. No. 7,604,019.

(60) Provisional application No. 60/701,787, filed on Jul. 22, 2005.

(51) Int. Cl.
F16K 17/36 (2006.01)
(52) U.S. Cl. ............ 137/81.1; 137/601.13; 128/204.29; 128/205.24
(58) Field of Classification Search ............... 137/78.5, 137/81.1, 597, 599.01, 601.13; 244/118.8, 244/194; 128/201.28, 204.29, 205.24
See application file for complete search history.

(56) References Cited

U.S. PATENT DOCUMENTS

| | | | |
|---|---|---|---|
| 2,973,702 A | 3/1961 | Andresen, Jr. | |
| 4,499,914 A | 2/1985 | Schebler | |
| 5,047,965 A | 9/1991 | Zlokovitz | |
| 5,199,426 A * | 4/1993 | Aldworth et al. | 128/205.24 |
| 5,251,148 A | 10/1993 | Haines et al. | |
| 6,035,878 A | 3/2000 | Adams et al. | |
| 6,305,401 B1 | 10/2001 | Uehara et al. | |
| 6,539,315 B1 | 3/2003 | Adams et al. | |
| 6,568,416 B2 | 5/2003 | Tucker et al. | |
| 6,584,999 B2 | 7/2003 | Inayama et al. | |
| 6,604,538 B2 | 8/2003 | Schmotzer | |
| 6,708,708 B2 | 3/2004 | Wingert et al. | |
| 6,758,233 B2 | 7/2004 | Sulatisky | |
| 6,779,541 B2 | 8/2004 | Inayama et al. | |
| 6,830,061 B2 | 12/2004 | Adams et al. | |
| 6,889,705 B2 | 5/2005 | Newman et al. | |
| 6,903,659 B2 | 6/2005 | Vanderah et al. | |
| 7,341,072 B2 | 3/2008 | Talty | |

* cited by examiner

*Primary Examiner*—John Rivell
*Assistant Examiner*—Craig M Schneider
(74) *Attorney, Agent, or Firm*—Fulwider Patton LLP

(57) ABSTRACT

The electromechanical regulator for passenger oxygen is a hybrid oxygen regulator that provides for electronic or mechanical regulation of oxygen flow. The electronic portion of the regulator consists of an inlet solenoid valve, an outlet solenoid valve, a cabin pressure transducer, a regulated output transducer and a PID based controller, and the solenoid valves are normally biased so that in the event of an electronic system failure or a power supply failure the system will automatically revert to mechanical operation.

7 Claims, 1 Drawing Sheet

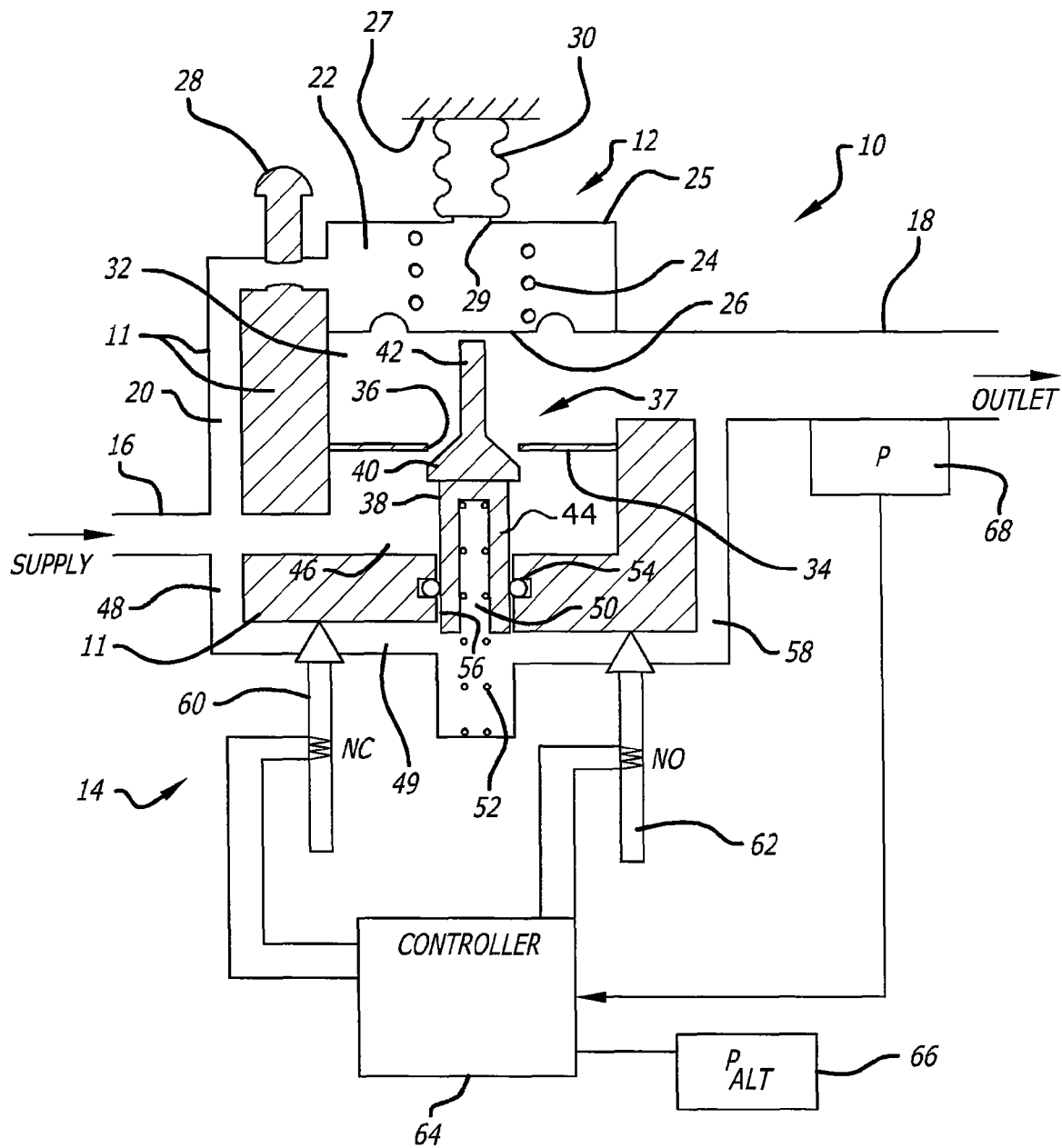
FIGURE

ELECTROMECHANICAL REGULATOR WITH PRIMARY AND BACKUP MODES OF OPERATION FOR REGULATING PASSENGER OXYGEN

CROSS-REFERENCES TO RELATED APPLICATIONS

The application is a continuation of application Ser. No. 11/489,935, filed Jul. 20, 2006, now Pat. No. 7,604,019, which is based on Provisional Application Ser. No. 60/701,787, filed Jul. 22, 2005.

BACKGROUND OF THE INVENTION

This invention relates to the metering and control of fluids, and more particularly relates to the metering and control of fluids of aircraft passenger supplemental oxygen, particularly as would be used in a commercial aircraft airliner.

Emergency oxygen supply systems such as are typically installed on aircraft to supply oxygen to passengers upon loss of cabin pressure at altitudes above about 12,000 feet typically include a source of supplemental breathable oxygen connected to a face mask that is released from an overhead storage compartment when needed. The flow of breathable oxygen should be sufficient to sustain passengers until cabin pressure is reestablished or until a lower, safer altitude can be reached.

One conventional mechanical oxygen pressure regulator is powered by the output pneumatic pressure to position its valve with a programmed accurate control of oxygen supply provided by a controller that includes a processor with an algorithm stored in its memory. The processor unit responds to sensors that sense valve position, upstream pressure, downstream pressure, and external inputs received through a communication unit. An orifice inside the regulator body establishes flow between the upstream pipeline and the downstream pipeline, and a valve disc moves to occlude or partially occlude the orifice to regulate the flow between the upstream pipeline and downstream pipeline.

A conventional type of electronic pressure regulator has a microprocessor control system that provides for the valve to smoothly approach the predetermined pressure without overshoot and minimum fluctuation. The microprocessor unit controls a normally closed input solenoid valve and an exhaust solenoid valve that are responsible for the diaphragm pressure of the pressure regulator. The valves are driven with a variable pulse width and variable frequency signal based on the difference between the predetermined pressure and the present pressure, resulting in the fluctuation-free operation to the desired pressure. Another similar fluid pressure regulator includes two PID controllers. The first PID and drive controller drive the normally closed solenoid-operated valves that are the input and exhaust to the pressure regulating diaphragm. The second PID and program controller provide a feedback loop for controlling pressure to a predetermined pressure or to supplying a controlled variable output with the program being internally stored or supplied from an external source.

Another type of electronic gas regulator has a diaphragm or piston regulator of a pressure reducing valve that is controlled by an electronically driven solenoid that operates feed and bleed valves. The arrangement of the bleed and feed is a bypass loop around the main pressure regulator, and it ensures that gaseous fuels being regulated are not vented to the atmosphere, but rather are vented to the outlet of the regulator with the regulated gaseous fuel. Pulse width modulation and/or frequency modulation may be used to vary the ratio of open and closed times, and thus the output pressure, or two coils may be used instead of one, allowing independent control of the valves to compensate for inertial effects. A spring biases the piston regulator of the pressure reducing valve to a closed position in engagement with the valve seat, and a high pressure lock-off solenoid or shut-off valve with a solenoid operating coil arranged so that the lock-off solenoid is in the fully closed position when the operating coil is de-energized.

Another conventional microprocessor controlled spring-biased gas pressure regulator is controlled by a pilot valve that is automatically effected by supplying augmenting pressure to the spring side of the diaphragm via an electronically adjustable regulator valve under the control of a microprocessor that can respond to historical drop data, temperature, outdoor temperature, time of day, week, or month, or the like. The pressure regulator includes an electrically operable valve assembly having a valve-closed condition when electrically energized and a valve-opened condition in the absence of energizing voltage, which bypasses the electrically controllable pressure regulating valve when the supply of electricity is interrupted.

It would be desirable to provide a hybrid electronic and mechanical regulator that is neither a fully mechanical regulator nor a fully electronic regulator, but rather is a combination of the two approaches, offering the best of both methods. It would also be desirable to provide such a hybrid electronic and mechanical regulator in which an outlet solenoid valve is normally open, so that in the event of an electronic system failure or a power supply failure the system will automatically revert to a fully operational mechanical regulator providing outlet pressure exceeding the required level. The present invention satisfies these and other needs.

SUMMARY OF THE INVENTION

Briefly, and in general terms, the present invention provides for a hybrid electromechanical regulator that is neither a fully mechanical regulator nor a fully electronic regulator that will automatically revert to a fully operational mechanical regulator providing outlet pressure exceeding a required level, in the event of an electronic system failure or a power supply failure.

During normal electronic operation, a solenoid operated inlet valve of the regulator prevents a bleed of oxygen from occurring when oxygen supply to passengers is not required. The electronic portion of the regulator consists of an inlet solenoid valve, an outlet solenoid valve, a cabin pressure transducer, a regulated output transducer and a PID based controller. The inlet solenoid valve is normally closed and the outlet solenoid valve is normally open so that in the event of an electronic system failure or a power supply failure the system will automatically revert to a fully operational mechanical regulator providing outlet pressure exceeding the required level. During mechanical operation of the electromechanical regulator, the mechanical portion of the regulator produces a linear outlet pressure as a function of the altitude pressure detected by an aneroid, and is designed to marginally exceed the required outlet pressure curve at all points.

The present invention accordingly provides for an electromechanical regulator including an electromechanical regulator valve body including a supply inlet chamber and an outlet chamber, an oxygen supply inlet port connected to the supply inlet chamber by a first supply channel for receiving oxygen from a source of oxygen, and an oxygen outlet port connected to the outlet chamber. The electromechanical regulator valve body includes a balanced valve including a valve poppet channel defined in the electronic regulator valve body. A valve diaphragm including an opening forming a valve seat separates the supply inlet chamber and the outlet chamber, and a valve poppet member is disposed in the valve poppet channel and is moveable therein between a valve closed position and a valve open position. The valve poppet member is biased to engage the valve seat in the valve closed position. The electromechanical regulator valve body includes an electronic valve portion operative to move the valve poppet member between the open and closed positions responsive to sensed cabin pressure in the aircraft and sensed output pressure in the oxygen outlet port. The electromechanical regulator valve body also includes a mechanical valve portion including a supply pressure sensing chamber, and the mechanical valve portion is operative to move the valve poppet member between the open and closed positions responsive to pressure in the supply pressure sensing chamber and pressure in the outlet chamber.

In one presently preferred aspect, the valve poppet member includes a poppet valve head to engage the valve seat, a poppet valve member base including an interior chamber, a seal disposed about the valve poppet channel and forming a seal with the poppet valve member base, and a spring biasing the valve poppet member to the closed position. In another presently preferred aspect, the electronic regulator also includes a movable diaphragm separating the supply pressure sensing chamber from the outlet chamber, with a pressure sensing spring disposed in the supply pressure sensing chamber which biases the movable diaphragm toward the valve poppet member. Pressure behind the movable diaphragm is controlled by an aneroid valve and adjusting screws. In another presently preferred aspect, the electromechanical regulator includes a second supply inlet passage connecting the oxygen supply inlet port to the supply pressure sensing chamber. The electromechanical regulator may also include a sensitivity adjusting screw mounted in the second supply channel for controlling flow of oxygen into the supply pressure sensing chamber.

In another presently preferred aspect, the electronic valve portion includes an electronic oxygen supply regulation chamber, a normally closed first or inlet side solenoid valve, a normally open second or outlet side solenoid valve, and a controller for controlling operation of the first and second solenoid valves. A third supply channel connects the electronic oxygen supply regulation chamber to the supply inlet chamber and an electronic supply regulating chamber outlet passage. The normally closed first solenoid valve is connected to the third supply channel and is movable between a valve open position and a valve closed position for opening and closing the third supply channel. The second solenoid valve is connected to the electronic supply regulating chamber outlet passage and is movable between a valve open position and a valve closed position for opening and closing the electronic supply regulating chamber outlet passage.

In another presently preferred aspect, the electromechanical regulator may include a cabin pressure transducer for sensing cabin pressure in the aircraft and generating a cabin pressure signal indicating cabin pressure, and an outlet pressure transducer sensing output pressure in the oxygen outlet port and generating an outlet port signal indicating pressure in the oxygen outlet port, the cabin pressure signal and the outlet port signal being received by the controller.

Other features and advantages of the present invention will become more apparent from the following detailed description of the preferred embodiments in conjunction with the accompanying drawing, which illustrates, by way of example, the operation of the invention.

BRIEF DESCRIPTION OF THE DRAWING

The FIGURE is a schematic diagram of an electromechanical regulator for regulating passenger oxygen for aircraft according to the present invention.

DETAILED DESCRIPTION OF THE PREFERRED EMBODIMENTS

Referring to the drawing, which is provided for purposes of illustration and by way of example, the present invention provides for an electromechanical regulator for regulating passenger oxygen 10, including a valve body 11 with a mechanical portion 12 and an electronic portion 14. An oxygen supply inlet port 16 is typically connected to a source of oxygen (not shown), such as one or more cylinders of compressed oxygen, for example, and an oxygen outlet port 18 is typically connected to one or more sets of breathing apparatus (not shown), typically including one or more individual reservoir bags and attached face masks. A passage 20 connects the supply inlet port to a supply pressure sensing chamber 22, in which a pressure sensing spring 24 is mounted at one end to a wall 25 of the supply pressure sensing chamber, with the other end of the pressure sensing spring connected to and supporting a movable diaphragm 26. A supply pressure sensitivity adjusting screw 28 optionally may be provided in the passage 20 for adjusting the flow of oxygen through the passage 20 to the supply pressure sensing chamber 22. An aneroid 30 exposed to cabin pressure controls the pressure in the supply pressure sensing chamber behind the movable diaphragm 26 in response to changes in cabin pressure. The aneroid 30 is typically mounted to a mounting substrate 27 adjacent to the wall 25 of the supply sensing chamber 22. While aneroids can have more than one physical form, in the embodiment depicted in the illustration, the aneroid is shaped in the form of a bellows. At equilibrium conditions, the bellows assumes a length, such that the pressure inside and outside the bellows is the same. As the ambient pressure surrounding the aneroid decreases, the bellows expands, becoming elongated. When the pressure increases, the bellows contracts. This movement closes and opens the aneroid valve vent hole 29 in the surface of item 25. Closing of the aneroid valve vent hole 29 can trap gas in cavity 22, applying increased biasing force on the diaphragm 26, in addition to the force applied by the sensing spring 24, and opening of the aneroid vent hole vents gas pressure from the cavity 22. The movable diaphragm 26 forms a movable wall of the outlet chamber or cavity 32, which is also connected to the oxygen supply inlet port 16 through an opening in a valve diaphragm 34, which also forms a valve seat 36 in the valve diaphragm 34.

A pressure balanced valve 37 controlling oxygen flow through the opening or valve seat 36 in the valve diaphragm 34 includes a pressure balanced valve poppet member 38, typically having a conical shaped seat engaging head 40 that engages the valve seat, with an elongated extension 42 that extends into the outlet chamber or cavity 32 on one side of the valve diaphragm 34, and a tubular valve member base 44, that extends into a supply inlet chamber 46 on the other side of the valve diaphragm 34. A supply channel or passage 48 is also connected to the oxygen supply inlet port 16 for conducting a flow of oxygen to an electronic supply regulation chamber 49, which is in turn connected to the open interior chamber 50 of the tubular valve member base 44 of the pressure balanced valve poppet. A compression spring 52 disposed in the tubular interior chamber 50 of the tubular valve member base 44 of the pressure balanced valve poppet biases the pressure balanced valve poppet to a closed position seating the head 40 of the pressure balanced valve poppet member in the valve seat 36. An o-ring seal 54 is provided about the tubular valve member base 44 of the pressure balanced valve poppet member in the valve poppet channel 56.

The electronic supply regulation chamber 49 is connected to an electronic supply regulating chamber outlet passage 58, which is connected to the oxygen outlet port 18 for providing an electronically controlled flow of oxygen to the oxygen outlet port 18. The electronic supply regulation chamber 49 also includes an inlet or supply side solenoid valve 60, which is biased to be normally closed, on an inlet side of the electronic supply regulation chamber 49, and an outlet side regulating chamber solenoid valve 62, which is biased to be normally open, on the outlet side of the electronic supply regulation chamber 49. A PID based controller 64 (for adjusting the pressure by feedback using a proportional pressure gain, an integral pressure gain, and a differential pressure gain) is connected to the inlet or supply side solenoid valve 60 and the outlet side regulating chamber solenoid valve 62 for controlling the operation of these solenoid valves. The controller may for example be connected to receive pressure signals received from a cabin pressure transducer 66 and an outlet pressure transducer 68.

During normal operation of the electromechanical regulator for regulating passenger oxygen, oxygen flow from the supply side to the outlet side is controlled electronically through the inlet and outlet side solenoid valves by the controller in response to sensed pressure such as from the cabin pressure transducer and outlet pressure transducer. The controller of the electromechanical regulator controls the pressure behind the poppet by raising the pressure by opening the inlet solenoid valve, and lowering the pressure by opening the outlet solenoid valve. Oxygen that is used for control is dumped into the regulator outlet line so that it is not wasted. The controller receives the pressure signals from the one or more sensors and uses the signals to compute the required outlet pressure. An error signal formed by subtracting the actual outlet pressure from the required pressure is used to determine which solenoid valve should be open. Increasing the pressure behind the poppet causes the outlet pressure to be reduced. When the actual outlet pressure reaches the required value the error is zero and both solenoids are closed.

The two control solenoids can be used to minimize the initial bleed requirement and also to create a surge function at the regulator outlet. By momentarily opening both the supply solenoid valve and the outlet solenoid valve simultaneously when the system is first turned on, supply pressure is fed directly to the downstream orifice, quickly raising the pressure to the desired level. Also the poppet is held closed. This allows the pressure in the cavity above the diaphragm to quickly rise to the required control pressure for the existing altitude. The pressure rises quickly because the volume in the cavity is kept at a smaller value by not allowing the diaphragm to expand. After a few seconds the supply solenoid is closed and the outlet solenoid remains opened. This allows the pressure behind the poppet to dump into the outlet line and the mechanical portion of the regulator to suddenly open fully thereby enhancing the surge function in the downstream volume. By controlling the time period of this initial control mode the surge pressure can be tailored to satisfy almost any requirement.

The inlet solenoid valve is normally closed and the outlet solenoid valve is normally open so that in the event of an electronic system failure or a power supply failure the system will automatically revert to a fully operational mechanical regulator providing outlet pressure exceeding the required level. During such a mechanical operation of the electronic regulator, the mechanical portion of the regulator produces a linear outlet pressure as a function of altitude pressure and is designed to marginally exceed the required outlet pressure curve at all points. The regulator is modeled after a standard diaphragm operated system but with a balanced poppet for both supply pressure and outlet pressure so that variation of both supply pressure and outlet pressure has little to no effect on regulator performance. The system uses an aneroid controlled oxygen bleed to ambient to control the pressure in the cavity above the diaphragm and hence, together with the sensing spring, to control the regulated outlet pressure. When pressure in the cavity 32 is low, the movable diaphragm 26 moves against the balanced poppet, causing the balanced poppet to move out of engagement with the valve seat, opening the passage through the valve diaphragm 34. The bleed into the cavity is adjustable to ensure consistent performance of the mechanical portion of the regulator. This bleed can be very low, of the order of 1 sccm, by making the cavity small and recognizing the fact that the regulator does not require a fast response time due to change of altitude. However, the bleed must be large enough to ensure that the regulator does reach the maximum regulated pressure within about ten seconds.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. An electromechanical regulator for regulating passenger oxygen for aircraft, comprising:
    a supply inlet chamber;
    an outlet chamber;
    an oxygen supply inlet port for receiving oxygen from a source of oxygen, said oxygen supply inlet port being connected in fluid communication with said supply inlet chamber;
    an oxygen outlet port connected to said outlet chamber;
    a balanced valve controlling fluid communication between said supply inlet chamber and said outlet chamber, and a valve member moveable between a valve closed position and a valve open position, said valve member being biased to the valve closed position;
    an electronic valve portion operative to control movement of said valve member between said open and closed positions responsive to sensed cabin pressure in the aircraft and sensed output pressure in said oxygen outlet port; and
    a mechanical valve portion including a supply pressure sensing chamber, said mechanical valve portion being operative to control movement of said valve member between said open and closed positions responsive to pressure in said supply pressure sensing chamber and pressure in said outlet chamber.

2. The electromechanical regulator of claim 1, wherein said supply pressure sensing chamber includes a wall having a surface defining an aneroid valve vent hole, and further comprising an aneroid exposed to cabin pressure and mounted adjacent to said aneroid valve vent hole, said aneroid contracting to open said aneroid valve vent hole to vent pressure from the supply pressure sensing chamber, and lengthening to close said aneroid valve vent hole to trap pressure in the supply pressure sensing chamber, responsive to changes in cabin pressure.

3. The electromechanical regulator of claim 1, further comprising a movable diaphragm separating said supply pressure sensing chamber from said outlet chamber, and wherein a pressure sensing spring is disposed in said supply pressure sensing chamber and biases said movable diaphragm toward said valve member.

4. The electromechanical regulator of claim 1, further comprising a second supply inlet passage connecting said oxygen supply inlet port to said supply pressure sensing chamber.

5. The electromechanical regulator of claim 4, further comprising a sensitivity adjusting screw mounted in said second supply channel for controlling flow of oxygen into said supply pressure sensing chamber.

6. The electromechanical regulator of claim 1, wherein said electronic valve portion comprises:
   an electronic oxygen supply regulation chamber, a third supply channel connecting said electronic oxygen supply regulation chamber to said supply inlet chamber, and an electronic supply regulating chamber outlet passage;
   a first solenoid valve connected to said third supply channel and movable between a valve open position and a valve closed position for opening and closing said third supply channel, said first solenoid valve being normally closed;
   a second solenoid valve connected to said electronic supply regulating chamber outlet passage and movable between a valve open position and a valve closed position for opening and closing said electronic supply regulating chamber outlet passage, said second solenoid valve being normally open; and
   a controller for controlling operation of said first and second solenoid valves.

7. The electromechanical regulator of claim 6, further comprising a cabin pressure transducer sensing cabin pressure in the aircraft and generating a cabin pressure signal indicating cabin pressure, and an outlet pressure transducer sensing output pressure in said oxygen outlet port and generating an outlet port signal indicating pressure in said oxygen outlet port, said cabin pressure signal and said outlet port signal being received by said controller.

* * * * *